Patented June 3, 1941

2,244,360

UNITED STATES PATENT OFFICE 2,244,360

FERROUS METAL ENAMEL

John L. Gallup, Newark, N. J., assignor to Radio Corporation of America, a corporation of Delaware No Drawing. Application June 9, 1939, Serial No. 278,323

2 Claims. (Cl. 106—36.2)

My invention relates to vitreous enamels and more particularly to vitreous enamels for metals such as nickel.

This application is a continuation in part of my application Serial No. 115,192, filed December 10, 1936, now U. S. Patent 2,175,689, for Enameled screens.

Vitreous enamels commonly used for enameling iron and other ferrous metals are, in general, low melting glasses containing up to about 19% of alkali, about 20% boric anhydrid, enough silica to make the melting or working range of the enamel fall within the temperature range 800° C. to 870° C. and small amounts of metal oxides, such as cobalt oxide, manganese oxide, or nickel oxide to improve the adherence of the enamel to the metal base. These enamels tend to start softening at temperatures considerably below 600° C., do not fit or match surfaces which are entirely or predominantly of nickel, tend to be somewhat porous because of entrapped air or gas, and are of low electrical resistivity as compared with lamp glass.

The principal object of my invention is to provide an enamel which is hard and is firmly bonded to and fits or matches nickel or other ferrous metal over a range of temperature up to the softening point of the enamel.

A further object is to provide an enamel which is more impermeable and less porous than the usual enamels for metal, and which is free from metallic oxides, such as lead oxide, arsenic oxide and similar poisonous oxides often found in enamels for ironware.

In accordance with my invention I provide a vitreous enamel in which the percentages of alkali and of silica are considerably higher and the percentage of boric anhydrid is lower than in the usual enamels and which is free from the metal oxides usually added to secure bonding to the metal. As compared with the usual enamels for ferrous metals, the melting or working range of this enamel is about 100° C. higher, yet it can be completely melted on a nickel or similar metal base to form a continuous glassy coating which is unusually free from pores and which remains without cracking or chipping firmly bonded to nickel or similar metals over a temperature range extending up to the melting range of the enamel.

I have found that a vitreous enamel having a higher melting range than the usual ferrous metal enamels and yet having a coefficient of thermal expansion such that it remains firmly and unbrokenly attached to nickel over a wide range of temperature can be made from a batch in which the constituents are present in the following percentages by weight:

| | Percent |
|---|---|
| $Na_2O$ | 15.0 |
| $K_2O$ | 8.0 |
| $CaO$ | 5.0 |
| $B_2O_3$ | 12.0 |
| $SiO_2$ | 60.0 |

This batch composition is, to within about ½% of each constituent, the composition of the enamel by analysis if the constituents of the batch are as pure as is commercially feasible. The enamel, which is somewhat more refractory than the usual enamel for ferrous sheet metals, has a firing range from 900° C. to 950° C. as compared with a firing range from 800° C. to 870° C. for the usual enamel, and starts to soften at about 615° C. The average coefficient of linear thermal expansion over a temperature range from room temperature to 600° C. is about 10 or $11 \times 10^{-6}$ for the usual ferrous sheet metal enamel, approximately $14 \times 10^{-6}$ for my enamel, and about $15.5 \times 10^{-6}$ for nickel. This coefficient of my enamel is higher than that of the usual ferrous enamels and is so close to that of nickel that the enamel maintains a firm bond to nickel without cracking or chipping off as the enamel is heated or cooled.

Another batch which produces a very good enamel of much higher electrical resistivity than the first batch is:

| | Percent |
|---|---|
| $NaO_2$ | 4.5 |
| $K_2O$ | 18.0 |
| $CaO$ | 12.0 |
| $B_2O_3$ | 7.5 |
| $SiO_2$ | 58.0 |

The percentages of the constituents may be varied within the following ranges, the sum of the sodium oxide and potassium oxide being considered as alkali:

| | Percent |
|---|---|
| Alkali | from 20 to 25 |
| Calcium oxide | from 4 to 15 |
| Boric anhydrid | from 5 to 15 |
| Silica | from 50 to 70 |

The ratio of sodium oxide to potassium oxide is not critical, since both of these oxides act in much the same way and may both be considered as alkali. Too much alkali decreases the electrical resistivity, and also increases the solubility of the enamel in water or alcohol, which, for some purposes, may be objectionable. Calcium oxide in excess of 15% imparts to the enamel a tendency to crystallize and too little reduces its electrical resistivity. Boric anhydrid below 5% seems to be of little benefit, and in excess of 15% tends to make the enamel too fluid and also decreases the coefficient of thermal expansion so much that too much alkali must be used to make the enamel fit nickel. Silica in excess of 70% raises the melting range beyond the desirable limit, and below 50% makes the enamel too soft and weak.

The enamel is prepared in accordance with the usual practice in making enamels. If finely powdered, it may be sprayed from an alcohol or water suspension, as it is relatively insoluble. For spraying, a good concentration is one gram of enamel to three cubic centimeters of the suspending liquid, and for obtaining very thin uniform coatings, the enamel should be powdered to a particle size under two microns. The enamel is so insoluble that it can be deposited from an alcohol or water suspension, for example, by electrophoresis which is not feasible with many of the usual enamels which are comparatively soluble in an alcohol or water suspension and are decomposed to some extent by the electric current.

The enamel of my invention is particularly useful for enameling nickel or any surface which is like nickel or consists predominantly of nickel.

In enameling nickel, for example, I find it advantageous to clean the nickel article thoroughly, then oxidize it slightly by heating in air until it assumes a greenish color, probably due to a film of nickel monoxide, NiO, and then spray it with the enamel ground to a particle size under two microns and suspended in either water or alcohol. The sprayed article is dried, and then fired at about 900° C. in air, preferably in an electric furnace, to fuse the enamel into a smooth glassy coating which completely covers all of the metal surface and adheres firmly to it. I prefer to apply the enamel in several thin coats, firing the article after each coat is applied, and thus bring the coating to the desired thickness, such as approximately three mils, on the surface of the article.

Enameled nickel in the form of wire or sheet metal may be made into various articles, such as electrical resistors, or other electrical devices. For example, I have found that in this way well insulated enameled metal screens can be made with a nickel wire woven screen of 65 mesh to 150 mesh, or from a sheet of electrolytic nickel between 1 and 3 mils thick, perforated to correspond to 65 to 150 mesh. Such screens are useful for various purposes.

For some electrical uses the electrical resistivity of the enamel is of importance. Enamel applied on metal and made from the first batch above specified has an initial electrical resistivity at room temperature of about $1 \times 10^{13}$ ohm centimeters, which is from 5 to 10 times the resistivity of the usual vitreous enamels thus applied, and it maintains a high resistivity at elevated temperatures even in the presence of compounds of silver and similar metals, which the usual ferrous enamels will not do. Enamel applied on nickel and made from the second batch above specified has for enamel the unusually high electrical resistivity of about $1 \times 10^{15}$ to $1 \times 10^{16}$ ohm centimeters, depending to some extent on the solution of nickel oxide from the nickel surface under the enamel. The glass away from the nickel surface probably has a much higher electrical resistivity.

I claim:

1. A vitreous heat resistant enamel capable of forming a coating firmly adherent to nickel and consisting of 55% to 65% silica, 4% to 15% calcium oxide, 5% to 10% boric anhydrid, and 20% to 25% alkali composed of sodium oxide and potassium oxide, said enamel having a coefficient of thermal expansion substantially the same as that of nickel from room temperature to about 600° C., a softening point of approximately 600° C., a melting range of about 900° C. to 950° C. and an electrical resistivity of about $1 \times 10^{13}$ ohm centimeters.

2. A vitreous enamel capable of forming a dense glassy firmly adherent coating on nickel and consisting of alkali 22%, calcium oxide 10%, boric anhydrid 8%, and silica 60%, and having an electrical resistivity of about $1 \times 10^{16}$ ohm centimeters and a softening point of about 615° C.

JOHN L. GALLUP.